(12) United States Patent
Kawanaka et al.

(10) Patent No.: US 10,267,260 B2
(45) Date of Patent: Apr. 23, 2019

(54) HEAT-RESISTANT MEMBER PROVIDED WITH HEAT-SHIELDING COATING, AND METHOD FOR MANUFACTURING SAME

(71) Applicant: HITACHI, LTD., Tokyo (JP)

(72) Inventors: Hirotsugu Kawanaka, Tokyo (JP); Ittou Sugimoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/510,986

(22) PCT Filed: Nov. 11, 2015

(86) PCT No.: PCT/JP2015/081677
§ 371 (c)(1),
(2) Date: Mar. 13, 2017

(87) PCT Pub. No.: WO2016/076341
PCT Pub. Date: May 19, 2016

(65) Prior Publication Data
US 2017/0284333 A1 Oct. 5, 2017

(30) Foreign Application Priority Data
Nov. 14, 2014 (JP) ................................ 2014-232054

(51) Int. Cl.
*F02F 3/12* (2006.01)
*C23C 24/08* (2006.01)
(Continued)

(52) U.S. Cl.
CPC ............... *F02F 3/12* (2013.01); *B22F 5/008* (2013.01); *B22F 7/004* (2013.01); *B22F 7/08* (2013.01);
(Continued)

(58) Field of Classification Search
CPC .......... F02F 3/12; F02F 2200/00; C23C 24/08
See application file for complete search history.

(56) References Cited

U.S. PATENT DOCUMENTS 4,752,535 A * 6/1988 Kvernes .................... C23C 4/02
427/452
4,830,932 A 5/1989 Donomoto et al.

FOREIGN PATENT DOCUMENTS

EP 0318228 A1 5/1989
JP 63-140004 A 6/1988
(Continued)

OTHER PUBLICATIONS

International Search Report, PCT/JP2015/081677, dated Feb. 16, 2016, 2 pgs.
(Continued)

*Primary Examiner* — Jacob Amick
*Assistant Examiner* — Charles Brauch
(74) *Attorney, Agent, or Firm* — Volpe and Koenig, P.C.

(57) ABSTRACT

Provided are a heat-resistant member provided with a heat-shielding coating suitable for stable manufacturing and excellent in heat-insulating, thermoresponsive and distortion accommodating properties, and a method for manufacturing the same. The heat-shielding coating includes a metallic portion formed of agglomerates of a plurality of metal particles, and inorganic compound particles dispersed in the metallic portion. The metal particles are diffusion-bonded each other, and the metallic portion and a base material of the heat-resistant member are diffusion-bonded each other. The manufacturing method includes the steps of depositing mixed particles of the metal particles and the inorganic compound particles on a surface of the base material in a film shape; resistance-heating the mixed particles by current-passing while pressurized in a thickness direction; diffusion-bonding the metal particles each other; and the metallic portion and the base material each other.

10 Claims, 10 Drawing Sheets

(51) Int. Cl.
| | |
|---|---|
| *B22F 5/00* | (2006.01) |
| *B22F 7/00* | (2006.01) |
| *B22F 7/08* | (2006.01) |
| *B23K 20/02* | (2006.01) |
| *C23C 24/00* | (2006.01) |
| *C23C 26/00* | (2006.01) |
| *C23C 28/00* | (2006.01) |
| *C23C 28/02* | (2006.01) |
| *C23C 30/00* | (2006.01) |
| *F02F 3/14* | (2006.01) |
| *F01L 3/04* | (2006.01) |
| *F02B 77/02* | (2006.01) |
| *F02B 77/11* | (2006.01) |

(52) U.S. Cl.
CPC .............. *B23K 20/02* (2013.01); *C23C 24/00* (2013.01); *C23C 24/08* (2013.01); *C23C 24/085* (2013.01); *C23C 24/087* (2013.01); *C23C 26/00* (2013.01); *C23C 28/00* (2013.01); *C23C 28/021* (2013.01); *C23C 28/023* (2013.01); *C23C 30/00* (2013.01); *F01L 3/04* (2013.01); *F02B 77/02* (2013.01); *F02B 77/11* (2013.01); *F02F 3/14* (2013.01); *B22F 2999/00* (2013.01); *F01L 2101/00* (2013.01); *F01L 2101/02* (2013.01); *F01L 2103/00* (2013.01); *F01L 2820/01* (2013.01); *F02F 2200/00* (2013.01)

(56) References Cited

FOREIGN PATENT DOCUMENTS

| | | |
|---|---|---|
| JP | 63140004 A * | 6/1988 |
| JP | 05-001364 A | 1/1993 |
| JP | 06-057396 A | 3/1994 |
| JP | 06-073522 A | 3/1994 |
| JP | 2000-312981 A | 11/2000 |
| JP | 2002-037665 A | 2/2002 |
| JP | 2004-277779 A | 10/2004 |
| JP | 2012-072746 A | 4/2012 |
| JP | 5136629 B2 | 2/2013 |

OTHER PUBLICATIONS

Extended European Search Report dated Mar. 8, 2018 for the European Application No. 15858487.0.

* cited by examiner

25 μm

HEAT-RESISTANT MEMBER PROVIDED WITH HEAT-SHIELDING COATING, AND METHOD FOR MANUFACTURING SAME

FIELD OF INVENTION

The present invention relates to a heat-resistant member provided with a heat-shielding coating, and a method for manufacturing the same.

BACKGROUND ART

An internal combustion engine such as a reciprocal engine of a vehicle, a ship and a generator is assembled by a cylinder block (or engine block), a cylinder head and a piston or the like. In a cylinder block, a piston is incorporated inside a cylinder, and a cylinder head is attached to the cylinder block. A combustion chamber of the internal combustion engine includes an inner wall of a cylinder provided in a cylinder block, a piston head provided on a top face of the piston, and a cylinder head. Conventionally, cast iron has been used for a material of members configuring such a combustion chamber. However, recently aluminum alloys with a less weight are more generally used therefor.

Higher output of an internal combustion engine can be achieved by increasing an engine displacement and compression rate. However, the higher compression rate becomes, the larger cooling loss of the engine becomes, which limits improvement of a thermal efficiency of the internal combustion engine. Such cooling loss of the engine generally covers approximately 30% of the thermal energy generated by the internal combustion engine. Accordingly, a decrease in the cooling loss is a key challenge for realizing an excellent internal combustion engine with higher output and lower fuel consumption.

Conventionally, a method for securing a heat-insulating property of the combustion chamber in the internal combustion engine is known available by forming a heat-shielding coating of ceramics on an inner wall of the combustion chamber, in which the ceramics are formed by firing an inorganic oxide, an inorganic carbide or an inorganic nitride. For example, ceramics such as zirconia have a high heat-resistant property and low thermal conductivity, allowing an excellent heat-resistant property of a heat-shielding coating of ceramics. However, ceramics tend to have a relatively high thermal capacity (i.e., thermal capacity per volumetric specific heat or a unit volume). This feature prevents a ceramic temperature from appropriately accommodating to change of a gas temperature in the combustion chamber.

Consequently, when such a heat-shielding coating of ceramics is used, a temperature of the inner wall of the combustion chamber is hardly lowered due to the heat filled inside the combustion chamber thus generated by a temperature rise of the inner wall during the combustion cycles of the internal combustion engine. This causes concerns of a decrease in intake efficiency and an incident of abnormal combustion.

As mentioned above, a heat-shielding coating is demanded to have performance excellent in a heat-resistant property and a low thermal conductivity as well as a low thermal capacity. Further, an inner wall of the combustion chamber is thermally expanded and contracted repeatedly during combustion cycles of the internal combustion engine, thereby to come under a strong combustion pressure generated by combustion gas. Therefore, such a heat-shielding coating is further demanded to have enough adhesivity hard to be peeled from the inner wall of the combustion chamber.

Hence, the following technologies have been developed for realizing a heat-resistant coating having a low thermal capacity and excellent adhesivity, for example, by forming an anodic oxide coating or a porous spray film on the inner wall of the combustion chamber. Further, other technologies are also proposed to form a heat-shielding coating by including hollow ceramic particles with a low thermal capacity in a metallic portion.

For example, Patent Document 1 discloses a heat-insulating structure including a hollow particle layer formed by densely filled with a number of hollow particles on a surface of the metallic base material, and a coating layer formed on the hollow particle layer. Further, it is disclosed that the hollow particle layer is formed by brazing the base material with a hollow particle mold prepared by bonding the hollow particles each other via pulse discharge firing or hot-molding with a binder film (see paragraphs 0046, 0051), and the coating layer is formed of metal or a metal oxide (see paragraphs 0041-0042).

Further, Patent Document 2 discloses a heat-shielding coating formed on a surface of a metallic base material. Herein, the heat-shielding coating is formed by bonding a plurality of ceramic hollow particles with a metallic portion via point jointing. Moreover, it is disclosed that the heat-shielding coating is formed by preparing slurry via mixing ceramic hollow particles with metal particle paste made of at least metal particles and a solvent, applying the slurry onto a surface of the metallic base material, heating the applied slurry at least at the temperature equal to or more than the boiling point of the solvent to evaporate the solvent, and further heating the slurry at least at the temperature equal to or more than the melting point of the metal particles to melt the metal particles so that the resulting molten metal coalesces between the plurality of hallow particles (see paragraphs 0049-0054).

DOCUMENTS OF PRIOR ART

Patent Documents

Patent Document 1: Japanese Unexamined Patent Application Publication No. 2012-072746
Patent Document 2: Japanese Patent Publication No. 5136629

SUMMARY OF INVENTION

Problems to be Solved by Invention

According to the technologies described in Patent Documents 1 and 2, such a heat-shielding coating may be formed as to have heat-resistant and heat-insulating properties as well as a low thermal conductivity and a low thermal capacity which contribute to the thermoresponsive property. Further, covering hollow particles with coating layers as described in Patent Document 1 and bonding hollow particles with a metallic portion may enable the heat-shielding coating to accommodate to the distortion generated following the thermal expansion and contraction of the coating.

Meanwhile, an anodic oxide coating used conventionally is formed in a porous state on a surface of a member made of aluminum or aluminum alloys. This allows the coating to be excellent in a thermal conductivity with a low thermal capacity. Additionally, the anodic oxide coating can be formed by passing a current through a member in an electrolyte solution without using other materials in combination. Therefore, this process may be also excellent in the production efficiency.

However, the method for forming a heat-shielding coating by brazing a hollow particle mold with a base material disclosed in Patent Document 1 needs several steps of forming the hollow particle mold, bonding the mold with the base material, and heating a wide area of the base material during the brazing step. As a result, the thermal stress generated by the heating steps is remained, which may damage the coating during a cooling process. This prevents a stable production of the coating.

Further, the method for forming a heat-shielding coating by bonding a plurality of ceramic hollow particles with a metallic portion via point jointing disclosed in Patent Document 2 needs to prepare a main body of the heat-shielding coating with the ceramic hollow particles in order to realize a low thermal capacity of the coating. This may increase the material cost, leading to loss of productivity. Moreover, it is difficult to create a homogenized molten state of the metal particles to be bonded with the hollow particles in the thickness direction. Accordingly, it is hard to stack multiple layers including the ceramic hollow particles in the thickness direction. This prevents increase in the coating thickness, although such increase is aimed for improving the heat-insulating property of the coating.

Further, it should be noted that an anodic oxide coating is only formed having an integrated structure deposited consecutive from a base material as well as a thickness of just 500 μm or less. This structural feature prevents the single-layer coating from having a sufficient heat-insulating property. Moreover, a spraying film used conventionally has poor performance for accommodating to the thermal distortion, which may cause peel-off of the coating due to the thermal fatigue. Furthermore, a material applicable to be splayed is limited to a substance of which particles to be splayed should sufficiently melt. Particularly, when the base material is made of aluminum etc., it is hard to give the spraying film sufficient adhesivity, leading to loss of productivity.

In view of the above disadvantages, an object of the present invention is to provide a heat-resistant member provided with a heat-shielding coating suitable for stable manufacturing and excellent in the thermoresponsive and distortion accommodating properties, and a method for manufacturing the same.

Means for Solving Problems

For solving the above disadvantages, a heat-resistant member of the present invention is provided with a heat-shielding coating. Herein, the heat-shielding coating includes a metallic portion formed of agglomerates of a plurality of metal particles, and inorganic compounds particles dispersed in the metallic portion. The metal particles are diffusion-bonded each other, and the metallic portion and a base material of the heat-resistant member are diffusion-bonded each other.

Further, a method for manufacturing the heat-resistant member of the present invention includes the steps of depositing mixed particles formed of the plurality of metal particles and the inorganic compound particles in a film shape, resistance-heating the mixed particles by passing a current therethrough while being pressurized in a thickness direction, and diffusion-bonding the metal particles each other, and the base material and the metallic portion formed of agglomerates of the plurality of metal particles.

Effect of Invention

According to the present invention, it is possible to provide a heat-resistant member provided with a heat-shielding coating suitable for stable manufacturing and excellent in the heat-insulating, thermoresponsive, and distortion accommodating properties, and a method for manufacturing the same.

BRIEF DESCRIPTIONS OF DRAWINGS

FIG. 5A is a schematic view of a heat-resistant member provided with a two-layer heat-shielding coating, and FIG. 5B is a schematic view of a heat-resistant member provided with a heat-shielding coating having a coating layer as the outmost layer.

FIG. 8A is a perspective view showing a piston of an internal combustion engine when viewed from the lower side thereof; and FIG. 8B is a perspective view of the pressurizing member.

EMBODIMENTS FOR CARRYING OUT INVENTION

Hereinafter, a heat-resistant member and a method for manufacturing the same in embodiments of the present invention will be described in detail. Herein, the common components showed through the drawings are represented by the same references, and duplicated descriptions are omitted.

Figure 1:
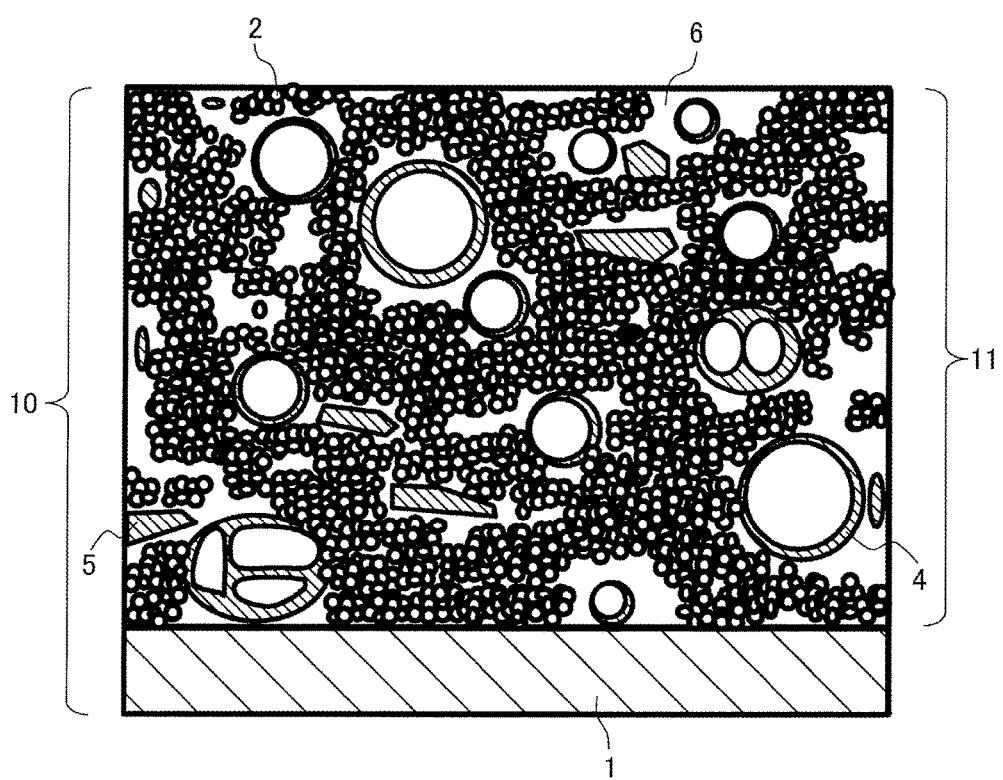
FIG. 1 is a schematic view exemplarily showing a cross-section of a heat-resistant member in an embodiment of the present invention.

FIG. 1 is a schematic view exemplarily showing a cross-section of a heat-resistant member in an embodiment of the present invention.

As shown in FIG. 1, a heat-resistant member 10 of the present embodiment is provided with a heat-shielding coating which includes a base material 1 formed of any material made of a metal, and a heat-shielding coating 11 deposited on a surface of the base material 1.

To the base material of the heat-resistant member 10, a metallic material which should have a heat-insulating property is applied. Specifically, such a metallic material includes a structure material, a mechanism member and a variety of parts or the like. A material requiring a thermo-responsive property capable of making the temperature of the material accommodate to the environmental temperature, in addition to a heat-insulating property is preferably applied to the base material 1.

The base material 1 of the heat-resistant member 10 may be made of an appropriate metal or a metal alloy, preferably steel, aluminum, copper, nickel, titanium, or alloys including those metals as a major component. Among them, aluminum or an aluminum alloy is most preferable. Those materials allow a light weight of the heat-resistant member 10. Further, those materials have an excellent conductivity, allowing stable formation of the heat-shielding coating 11 with homogeneity.

The heat-shielding coating 11 includes a metallic portion (11) formed of agglomerates of a plurality of metal particles 2, and inorganic compound particles (4, 5) dispersed in the metallic portion (11). As shown in FIG. 1, the inorganic compound particles (4, 5) are randomly and irregularly dispersed in the heat-shielding coating 11 in the thickness and width directions. In the heat-resistant member 10 in FIG. 1, a combination of hollow inorganic compound particles 4 each having a hollow structure and solid inorganic compound particles 5 each having a solid structure is used for the inorganic compound particles (4, 5).

As shown in FIG. 1, in the heat-resistant member 10, the metal particles 2 are diffusion-bonded each other. The metallic portion (11) and the base material 1 of the heat-resistant member 10 are diffusion-bonded. That is, no molten metal in a liquid phase is not formed between the metal particles 2, while the metal particles 2 are bonded each other in a solid phase. Further, in the vicinity of an interface between the heat-shielding coating 11 and the base material 1, the heat-shielding coating 11 and the base material 1 are bonded in a solid phase without once molten to be in a liquid phase at the bonding process. As mentioned above, the diffusion-bonding between the metal particles 2, and between the metallic portion (11) and the base material 1 enable the heat-shielding coating 11 to preferably accommodate to thermal distortion, thereby producing the heat-shielding coating 11 excellent in durability, hard to be cracked or peeled off even when receiving thermal stress and external force.

Figure 2:
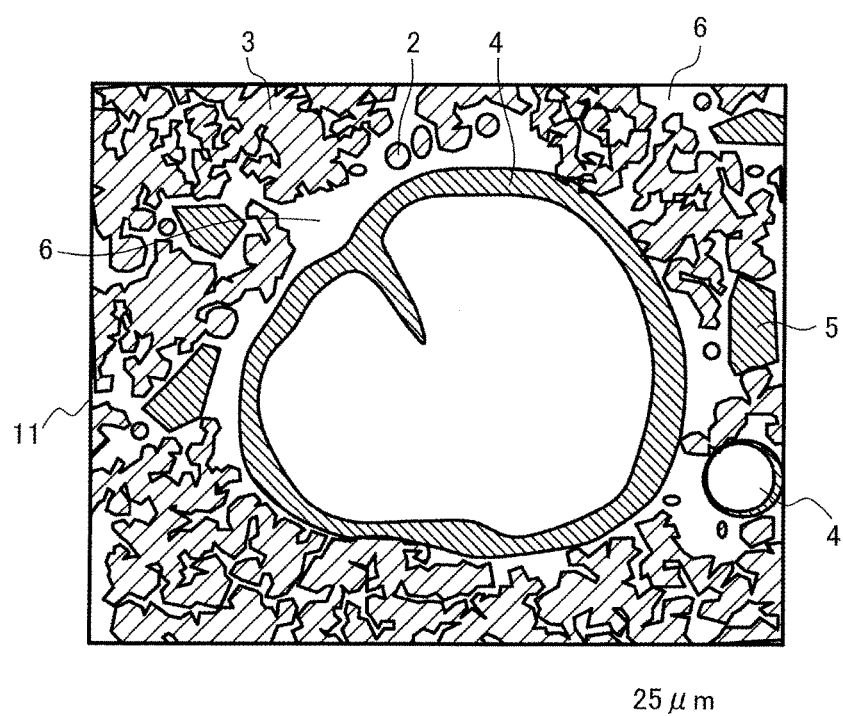
FIG. 2 is an enlarged view exemplarily showing a cross-section of a heat-resistant member in an embodiment of the present invention.

FIG. 2 is an enlarged view exemplarily showing a cross-sectional structure of the heat-resistant member in an embodiment of the present invention.

FIG. 2 shows an enlarged view in a vicinity of the hollow inorganic compound particle 4 dispersed in the metallic portion (11) of the heat-shielding coating 11. As shown in FIG. 2, an agglomerate 3 is formed via agglomeration of the metal particles through the diffusion-bonding. The agglomerate 3 substantially maintains particle shapes of the individual metal particles 2, differing from a metallographic structure formed via resolidification of once molten metal in a liquid phase. Further, a part of the metal particles 2 does not form any agglomerate 3, but independently maintains the particle shape. As a result, micro pores 6 are remained around the metal particles 2 and the agglomerates 3 over the entire region of the metallic portion (11).

In contrast, each of the inorganic compound particles (4, 5) has a mean particle diameter larger than the metal particles 2, and the inorganic compound particles (4, 5) are not diffusion-bonded to the metal particles 2. Thus, pores (6) with relatively large sizes are formed around the inorganic compound particles (4, 5).

Further, many metal particles 2 each keeping a particle shape, differing from the metal particles 2 in the agglomerate 3, are distributed around the inorganic compound particles (4, 5) so that the micro pores 6 are remained in a high concentration. Those micro pores 6 are randomly and irregularly present in the thickness and width directions of the heat-shielding coating 11, contributing to improvement of the heat-insulating property and realization of the low thermal capacity. Further, this structural feature exerts the effects for preventing the distortion and cracks of the heat-shielding coating 11 caused by the thermal stress and outer force.

For the metal particle 2, a particle made of appropriate metal and a metal alloy may be used depending on the desirable performance required for the heat-resistant member 10. Preferable materials are, for example, steel, aluminum, copper, nickel, titanium, or alloys containing those materials as a main component. Such metal particles 2 secure preferable conductivity of the heat-shielding coating 11 in the process of pressurized current-passing when the heat-shielding coating 11 is formed, allowing the plurality of metal particles 2 to be uniformly diffusion-bonded. Further, the preferably conducted diffusion-bonding enables sure production of the pores 6 having a high volume fraction.

The metal particles 2A preferably have a mean particle diameter which is at most one-third time as large as that of the inorganic compound particles (4, 5), more preferably at most one-tenth time. The smaller mean particle diameter of the metal particles 2 than those of the inorganic compound particles (4, 5) increases the accessibility of the metal particles 2 in the process of pressurized current-passing performed when the heat-shielding coating 11 is formed. This allows uniform diffusion-bonding of the metal particles 2 each other as well as uniform diffusion-bonding between the base material 1 and the metal particles 2 each other.

A material of the metal particles 2 may be the same as or different from that of the base material 1. When the same materials are used for the metal particles 2 and the base material 1, distortion caused by a difference in the coefficients of thermal expansion may be prevented, leading to decrease in the peeling of the heat-shielding coating 10. On the other hand, when the metal particles 2 have a different material from the base material 1, and a combination of appropriate materials is selected therefor, it is possible to form an intermediate layer 7 made of an intermetallic compound (see FIG. 3).

Figure 3:
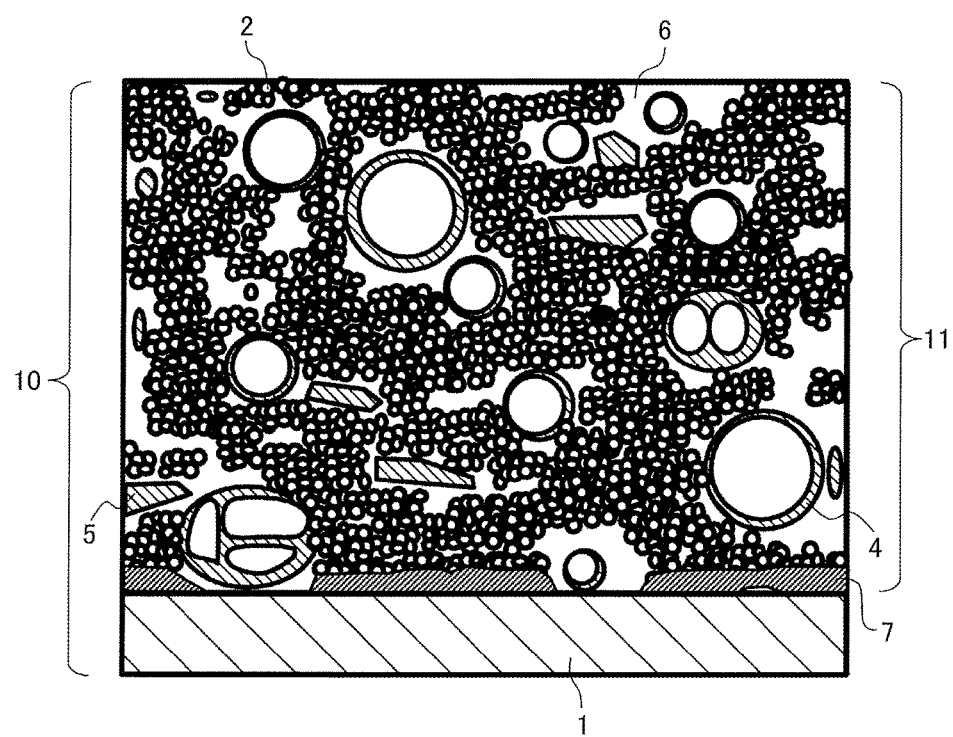
FIG. 3 is a schematic view showing another example of a cross-section of a heat-resistant member in an embodiment of the present invention.

FIG. 3 is a schematic view showing another example of a cross-sectional structure of a heat-resistant member in an embodiment of the present invention.

As shown in FIG. 3, when the metal particles 3 have a different material from the base material 1, the heat-shielding coating 11 may have a structure including an intermediate layer 7 made of an intermetallic compound between the metallic portion (11) and the base material 1. In this structure, the metallic portion (11) and the base material 1 are diffusion-bonded across the intermediate layer 7.

The intermediate layer 7 is formed of an intermetallic compound including atoms derived from the metal particles 2 and different atoms derived from the base material 1. Herein, the atoms derived from the metal particles and the different atoms derived from the base material 1 are respectively diffused in the process of diffusion-bonding when the heat-shielding coating is formed, and bonded together thereby to form the intermetallic compound. Examples of the intermetallic compound include, for example, FeAl, Fe$_3$Al, NiAl and Ni$_3$Al or the like. Such an intermediate layer 7 may be formed by combining appropriate materials depending on the heating temperature. The formation of the intermediate layer 7 may improve the heat-resistant property of the heat-resistant member 10.

Here, particles of appropriate materials may be used for the inorganic compound particles (4, 5). Preferable particles include silica, silica balloon, alumina, alumina babble, zirconia, glass, foamed glass, shirasu soil, and fly ash balloon or the like. The inorganic compound particles (4, 5) may be either a crystalline compound or an amorphous compound, and formed in an appropriate shape such as a spherical, tabular, rectangular or fibrous shape. The hollow inorganic compound particles 4 may be prepared, for example, by mixing resin particles and inorganic compound powder, coating the resin particles with the inorganic compound powder, and subsequently firing the resulting mixture to remove the resin particles via thermal decomposition thereof. The inorganic compound particles (4, 5) have a mean particle diameter preferably ranging from about 30 μm to about 80 μm.

FIG. 1 shows a combination of hollow inorganic compound particles 4 and solid inorganic compound particles 5 both used as the inorganic compound particles (4, 5). Here, instead of this, only the hollow inorganic compound particles 4 may be used. Alternatively, only the solid inorganic compound particles 5 may be used. However, preferably the hollow inorganic compound particles 4 are used for the purpose of reducing the thermal capacity of the heat-resistant member 10.

On the other hand, the solid inorganic compound particles 5 have superior mechanical strength and durability to the hollow inorganic compound particles 4. Therefore, it is possible to improve the strength and durability of the heat-resistant member 10 by using the solid inorganic compound particles 5 alone or in combination with the hollow inorganic compound particles 4.

Preferably, a volume fraction of the inorganic compound particles (4, 5) in the metallic portion (11) ranges from 10% to 65%, more preferably from 10% to 50%. When the volume fraction of the inorganic compound particles (4, 5) is set at 10% or less, a porosity of the heat-resistant coating 11 may be preferably secured, allowing the thermal capacity of the heat-resistant coating 11 to be sufficiently reduced. Further, when the volume fraction of the inorganic compound particles (4, 5) is set at 65% or less, an enough volume fraction of the metal particles 2 may be used.

This setting enables a preferable conductivity to be secured in the process of pressurized current-passing performed when the heat-shielding coating 11 is formed, allowing the certain execution of the diffusion-bonding.

Next, a method for manufacturing a heat-resistant member in an embodiment of the present invention will be described in detail.

Figure 4A:
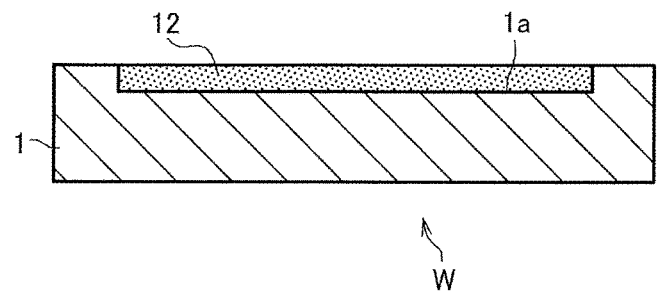
FIG. 4A is a schematic cross-sectional view of a material to be processed used for manufacturing a heat-resistant member in an embodiment of the present invention.
Figure 4B:
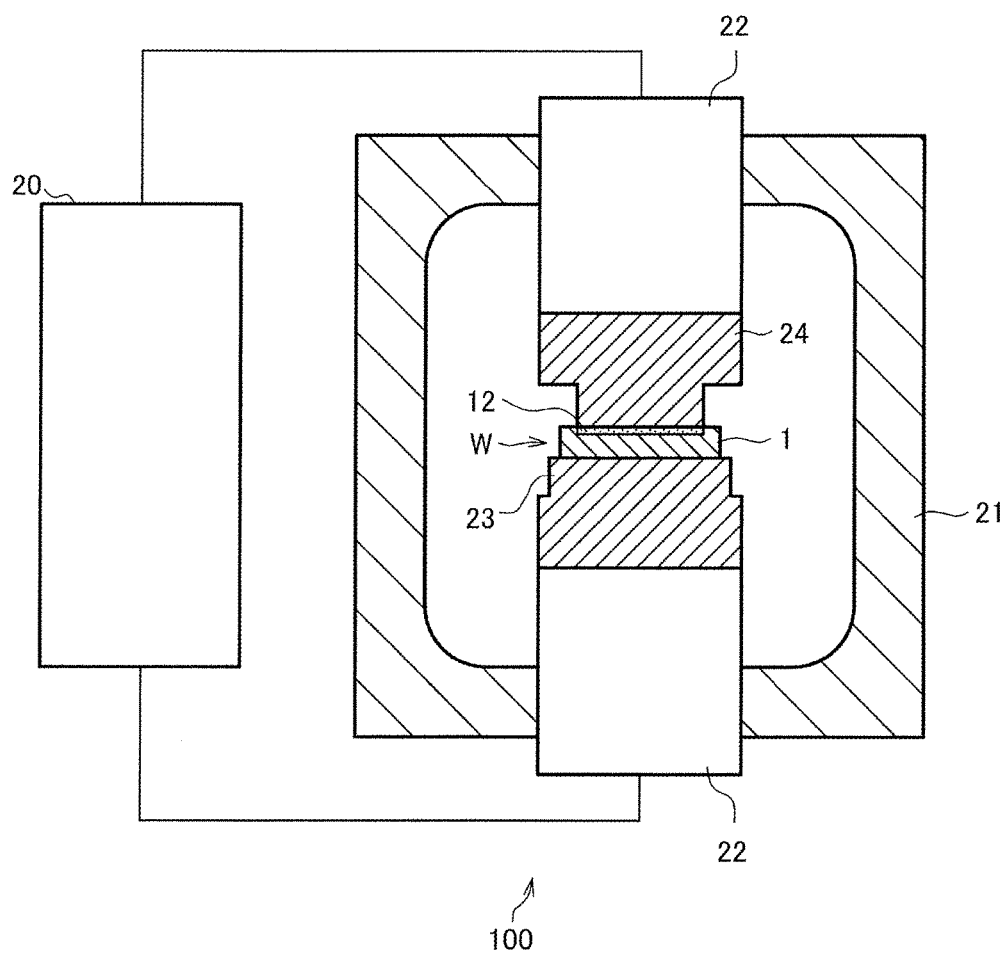
FIG. 4B is a schematic cross-sectional view of a current-bonding device used for manufacturing a heat-resistant member in an embodiment of the present invention.

FIGS. 4A and 4B are a cross-sectional view respectively showing a material and a current-bonding device used for manufacturing a heat-resistant member in an embodiment of the present invention. FIG. 4A is a schematic cross-sectional view of the material, and FIG. 4B is a schematic view of the current-bonding device.

A method for manufacturing a heat-resistant member in the present embodiment includes the steps of depositing mixed particles of a plurality of metal particles and inorganic compound particles on a surface of a base material in a film shape, resistance-heating the mixed particles thus deposited in a film shape with pressurized in the thickness direction, and diffusion-bonding the metal particles each other, and the base material and a metallic portion formed of agglomerates of the plurality of metal particles each other.

In the manufacturing method, the mixed particles 12 including the metal particles 2 and the inorganic compound particles (4, 5) are deposited on a surface of the base material 1, and the resulting base material 1 is used as a material W to be processed (see FIG. 4A). Then, the material W is subjected to pressurized current-passing performed by the current-bonding device 100 shown in FIG. 4B, thereby manufacturing the heat-resistant member 10 provided with the heat-shielding coating 11.

When the heat-resistant member 10 is manufactured, first, the mixed particles 12 including the metal particles 2 and the inorganic compound particles (4, 5) are deposited in a film shape on a surface of the base material 1 on which the heat-resistant coating 11 is to be formed. The mixed particles 12 may be prepared by either dry-blending or wet-blending. The blending may be performed by an appropriate device such as a V-shape rotating mixer, a W-type mixer, a vibration blender, and a dram-type mixer. A volume rate and a particle diameter distribution of the metal particles 2, the hollow inorganic compound particles 4 and the solid inorganic compound particles 5 may be appropriately adjusted for the use.

As shown in FIG. 4A, preferably a recessed portion 1a is formed on a surface of the base material 1. In the manufacturing method, the mixed particles 12 deposited in a film shape are pressurized to form the heat-shielding coating 11. Herein, the mixed particles 12 are filled in the recessed portion 1a, which prevents the mixed particle 12 from being removed from the surface of the base material 1 while they are pressurized. This allows the heat-resistant coating 11 to be formed having uniform distributions of the inorganic compound particles (4, 5) and the pores 6 as well as an extremely accurate thickness. Note, the recessed portion 1a may be appropriately formed depending on a shape of the base material 1 and a shape of the heat-shielding coating 11 to be formed in the process. Further, a depth of the recessed portion 1a may be designed corresponding to a thickness of the heat-shielding coating 11 to be formed, and a bulk density of the mixed particles 12 or a load when pressurized thereto.

In the method for manufacturing the heat-resistant member 10, next, the mixed particles 12 deposited on a surface of the base material 1 is resistance-heated via current-passing while pressurized in the thickness direction. The pressurized current-passing diffusion-bonds the base material 1 and the metallic portion (11) formed of agglomerates of the metal particles 12, thereby forming the heat-shielding coating 11 on the base material 1. The pressurized current-passing may be performed by a current-bonding device 100 (see FIG. 4B).

As shown in FIG. 4B, the current-bonding device 100 includes an electric source 20, a chamber 21, a pair of electrodes 22, and a not shown drive mechanism. The pair of the electrodes 22 are respectively connected to the electric source 20 via a conductive wire, and current-passing is performed between the pair of electrodes 22. Further, the pair of electrodes 22 may be relatively moved in the direction of facing each other via not shown drive mechanism.

Pressurizing members 23, 24 are detachably attached to the electrodes 22, respectively as shown in FIG. 4B, and the material W held by the pressurizing members are fixed between the electrodes 22. Therefore, when the electrodes are moved by the not shown drive mechanism, a load is applied to the material W, causing the mixed particles 12 to be mechanically pressed.

The pressurizing members 23, 24 are made of a material having an electric conductivity and mechanical strength suitable for pressurizing. For example, such a material is a carbon substance. Thus, when the material W is placed between the pressurizing members 23, 24, and the mixed particles 12 are mechanically pressed, the pressurized current-passing process may be performed by the current supplied from the electric source 20.

When the current-passing is started, July heat is generated in the base material 1 and the metal particles 2, which makes the metal particles 12 diffusion-bonded each other, and also makes the metallic portion (11) and the base material 1 diffusion-bonded under the conditions of pressurized heating.

During the pressurized current-passing process, the bonding proceeds mainly in the vicinity of the interface between the metal particles 12 and the base material 1 by the interface resistance. This suppresses the thermal distortion of the base material 1 and the metal particles 12 to a low degree.

A current flowing during the pressurized current-passing is preferably a pulse current. When a pulse current made by passing a high current repeatedly and intermittently is used for the pressurized current-passing, the metal particles 12 are uniformly heated each other, and the metallic portion (11) and the base material 1 are also uniformly heated.

This enables suppression of the thermal deformation of each metal particle 12. Further, the metal particles 12 are joint-bonded each other, and the base metal 1 and the metal particles are also joint-bonded, allowing the porosity to be secured and the heat-shielding coating 11 to be formed having more uniformly distributed mechanical strength.

In the pressurized current-passing process, the material W is housed in an airtight chamber 21, and then processed. Preferably, inert gas such as argon gas is filled inside the chamber 21, or the chamber 21 is vacuumed. This prevents oxidation of a bonded surface formed via diffusion-bonding, and intrusion of hydrogen and nitrogen into pores 6, allowing improvement of the durability of the heat-shielding coating 11. Further, particularly under the inert gas atmosphere, the inside pressure of each pore 6 is maintained compared to the conditions under the vacuum atmosphere, causing an advantageous effect for securing the porosity.

According to the method for manufacturing the heat-resistant member in the present embodiment, the heat-shielding coating 11 may be formed by diffusion-bonding via resistance-heating the metal particles 2. Thus, it is not necessary to heat a wide area of the base material 1. Further, depending on the shape of the heat-resistant member to be manufactured, the heat-resistant member may be manufactured by only the steps concentrated on the pressurized current-passing, resulting in a shorter lead time.

Thereby, the thermal stress generated by heating is hardly remained in the base material 1, which reducing the defects at the cooling process, enabling the heat-resistant member with a reduced thermal history to be stably manufactured.

Further, when the pressurizing members 23, 24 and conditions of the pressurized current-passing process are appropriately designed, the heat-resistant members may be produced in a highly efficient manner via only the step concentrated on the pressurized current-passing. Moreover, it is not necessary to use organic solvents and binders in the manufacturing process, which realizes a manufacturing method imposing a less load on the environment.

In the heat-resistant member 10 manufactured by the above method, the heat-shielding coating 11 is formed of the metal particles 2 and the inorganic compound particles (4, 5), giving the heat-shielding coating 11 a good heat-resistant property. The heat-shielding coating 11 thus formed includes the metallic portion (11) of the metal particles 2, in which the metal particles 2 are diffusion-bonded each other, and the base material 1 and the metal particles 12 are also diffusion-bonded.

This structural feature enables the heat-shielding coating 11 to be excellent in accommodating to the distortion caused by the heat stress and outer force, whereby the hollow inorganic compound particles 4 with a high heat-insulating property and a low thermal capacity are stably held in the metallic portion (11). Further, the heat-shielding coating 11 has a high porosity and a uniform distribution of the pores 6, enabling the heat-shielding coating 11 to have a low thermal capacity and accommodation to the distortion.

Further, the manufacturing method may decrease the restrictions on the thickness of the heat-shielding coating 11 thus formed. For example, the heat-shielding coating 11 may be formed by depositing the mixed particles 12 of the metal particles 2 and the inorganic compound particles (4, 5), diffusion-bonding the deposited mixed particles 12 via performing the pressurized current-passing all at once. Alternatively, a multilayered heat-shielding coating 11 may be formed by successively diffusion-bonding the mixed particles 12 of the metal particles 2 and the inorganic compound particles (4, 5) thus deposited in a film shape via repeatedly conducting the series of pressurized current-passing processes.

Accordingly, the thickness of the heat-shielding coating 11 may be increased thereby more improving the heat-insulating property thereof. The heat-shielding coating 11 of the heat-resistant member 10 preferably has a thickness ranging from 0.1 mm to 5 mm.

The heat-resistant member 10 provided with the heat-shielding coating 11 may be applied to a structural material, a mechanism member and a variety of components all of which should have a heat-insulating property. Examples for the application include, for example, a piston for an internal combustion engine, a cylinder head, a cylinder liner, a valve seat including intake and exhaust valves, liners of intake and exhaust ports, a supercharger turbine, a turbine blade of a turbine engine or a generator or the like. Herein, the most preferable application is a piston for an internal combustion engine which may be provided by forming a heat-shielding coating 11 on a piston head (i.e., base material 1) of the piston. This configuration may provide a piston for an internal combustion engine having a good heat-resistant property.

The base material 1 is suitably used for a piston made of aluminum or aluminum alloys. As to the metal particles 2, suitably used are particles made of aluminum, aluminum alloys, nickel or nickel alloys. A piston for an internal combustion engine is suitable to be placed in the current-bonding device 100, and subjected to the current-passing. The heat-shielding coating 11 may be formed to be fitted with a variety of valve recesses by designing a pressurizing member. Therefore, a piston is a preferable application because the workability is not limited.

Next, modified examples of a heat-resistant member in some embodiments will be described in detail.

Figure 5A:
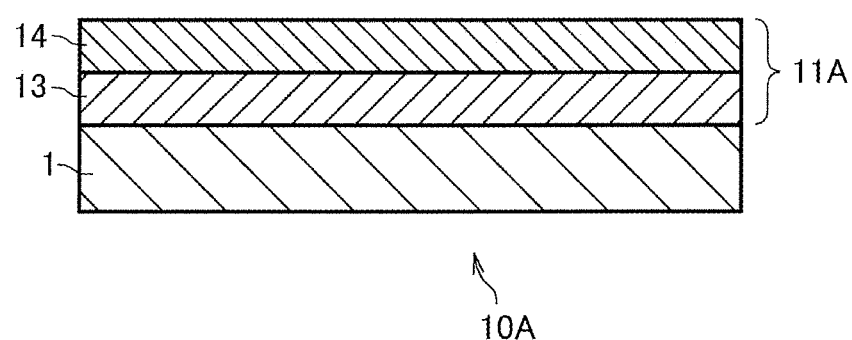
FIGS. 5A and 5B are schematic views each showing a layer structure of a heat-resistant member in a modified embodiment.
Figure 5B:
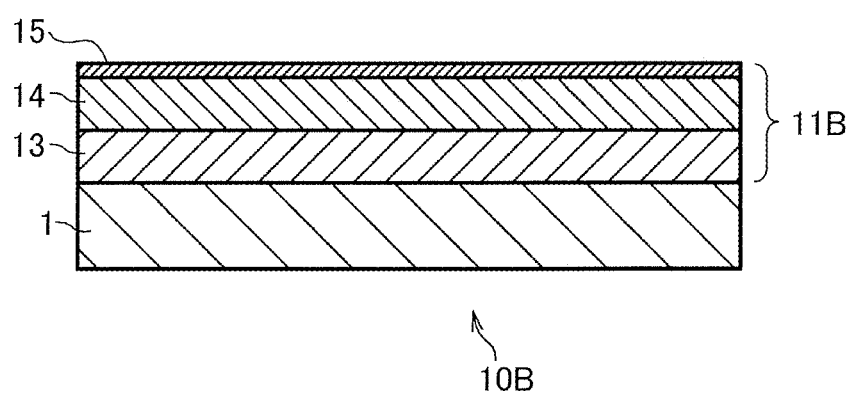

FIGS. 5A and 5B are schematic views each showing a layer structure of a heat-resistant member in a modified example. FIG. 5A is a schematic view of a heat-resistant member provided with a two-layer heat-shielding coating.

FIG. 5B is a schematic view of a heat-resistant member provided with a heat-shielding coating having a coating layer as the outmost layer.

The heat-resistant member 10 in the above modified example may have a layer structure where volume fraction of the inorganic compound particles (4, 5) is gradiently distributed in the thickness direction, instead of a layer structure where the inorganic compound particles (4, 5) of the heat-shielding coating are uniformly dispersed in the metallic portion (11).

As shown in FIG. 5A, in the heat-resistant member 10A of the modified example, the heat-shielding coating 11A includes a inner layer 13 having a relatively low volume fraction of the inorganic compound particles (4, 5), and an outer layer 14 having a relatively high volume fraction of the inorganic compound particles (4, 5). That is, the inorganic compound particles (4, 5) are gradiently distributed with respect to the volume fraction in the thickness direction.

When the volume fraction of the inorganic compound particles (4, 5) in the outer layer of the heat-shielding coating 11A is increased, the outer layer may increase the porosity thereby to decrease the thermal capacity thereof. On the contrary, when the volume fraction of the metal particles 2 in the inner layer of the heat-shielding coating 11A is increased, the inner layer may secure the mechanical strength and electric conductivity in the pressurized current-passing.

In FIG. 5A, the heat-shielding coating 11A has a two-layer structure including an inner layer 13 and an outer layer 14. However, the heat-shielding coating 11A may have an at least three-layer structure where the volume fraction of the inorganic compound particles (4, 5) is gradiently distributed in the thickness direction. Herein, the layer structure of the inorganic compound particles (4, 5) is not limited to one where the volume fraction of the inorganic compound particles (4, 5) is stepwisely changed with a difference in level in the thickness direction, but may be one where the volume fraction of the inorganic compound particles (4, 5) is continuously changed in the thickness direction.

Such heat-shielding coatings having the above layer structures may be formed by a method of depositing the mixed particles 12, which are to be used as a raw material, on a surface of the base material 1 in advance so that the volume fraction of the inorganic compound particles (4, 5) is stepwisely or continuously changed, and diffusion-bonding the resulting mixed particles via subjected to the pressurized current-passing all at once.

Alternatively, the heat-shielding coatings having the above layer structures may be formed by a method of depositing the mixed particles 12, which are to be used as a raw material, on a surface of the base material 1, successively performing the pressurized current-passing of the deposited mixed particles 12, and repeatedly performing the above depositing and pressurized current-passing steps a plurality of times.

Further, the heat-resistant member 10 in the above modified example may have a layer structure where the heat-shielding coating 11 has a coating layer on a surface of the metal portion (11) opposite to the base material 1.

As shown in FIG. 5B, in the heat-resistant member 10B in a modified example, the heat-shielding coating 11B includes a coating layer 15 on an outer layer 14 with a relatively high porosity based on the high volume fraction of the inorganic compound particles (4, 5). The coating layer 15 includes agglomerates of the plurality of metal particles 2 and has a lower porosity than the metallic portion (11) just under the coating layer 15 (i.e., metallic portion (11) of the outer layer in FIG. 5B). When such a coating layer is arranged at the most outer layer side of the heat-shielding coating 11B, the surface strength of the heat-shielding coating 11B may be improved. Herein, a material of the metal particles 2 forming the coating layer 15 may be the same as or different from that of the metallic portion (11) at the base material (1) side.

In FIG. 5B, the heat-shielding coating 11B has a layer structure where the coating layer 15 is arranged on the tow-layer stack consisting of the inner layer 13 and the outer layer 14. However, a layer structure between the coating layer and the base material 1 may include a single layer or at least three-layer stack. Further, such a layer structure may have either one where the volume fraction of the inorganic compound particles (4, 5) is not distributed changing in the thickness direction, one where the volume fraction of the inorganic compound particles (4, 5) is distributed stepwisely changing with a difference in level in the thickness direction, or one where the volume fraction of the inorganic compound particles (4, 5) is distributed continuously changing in the thickness direction.

The above described coating layer 15 may be formed by a method of depositing the metal particles 2 to be used for forming the coating layer 15 on the most outer layer of the mixed particles thus deposited on the surface of the base material 1, and diffusion-bonding those particles via the pressurized current-passing all at once. Alternatively, the coating layer 15 may be formed by a method of depositing the metal particles 2 to be used for forming the coating layer 15 on the metallic portion (11) already bonded to the base material 1, and diffusion-bonding the metal particles 2 via the successive pressurized current-passing.

EXAMPLES

Hereinafter, the present invention will be described in more detail referring to Examples of the present invention. However, the technological scope of the present invention is not limited to those Examples.

As Examples of the present invention, manufactured were Examples 1-1 to 1-7 each being a heat-resistant member provided with a heat-shielding coating having a monolayer structure, and Examples 2-1 to 2-3 each being a heat-resistant member provided with a heat-shielding coating having a multilayer structure.

Example 1-1

A heat-resistant member of Example 1-1 was manufactured by using particles made of pure nickel with a mean particle diameter of 3 μm with a volume fraction of 82 volume % as the metal particles, and shirasu soil with a mean particle diameter of 50 μm with a volume fraction of 18 volume % as the hollow inorganic compound particles.

A base material of the heat-resistant member was prepared by forming a metal mold casting made of the aluminum alloy "AC8A-T6" (JIS H 5202) in a disk shape with a diameter of 50 mm and a thickness of 10 mm, including a recess portion with a diameter of 30 mm and a depth of 5 mm on one side of the disk. Further, as shirasu soil, shirasu balloons "MSB-301" were used having a composition of 75 volume % $SiO_2$, 22 volume % $Al_2O_3$, and the remaining part of a Fe oxide, a Mg oxide or a Ti oxide.

The mixed particles formed of the metal particles and the inorganic compound particles were deposited on the recessed portion of the base material in a film shape, and the base material was sandwiched by the pair of pressurizing members, thereby to be set in the current-bonding device having a structure shown in FIG. 4B.

Herein, a bottom part of the pressurizing member facing to the base material was made of a carbon substance in a cylindrical shape with a diameter of 60 mm, and a top part of the pressurizing member was made of a carbon substance in a cylindrical shape with a diameter of 30 mm so that the pressurizing member was fitted having a small gap to the recessed portion of the base material when pressurized. Further, the electrodes of the current-bonding device were configured to move so that the top part of the base material was kept at the initial position, while the bottom part thereof moved.

The pressurized current-passing was performed by a pulse current. The inside of the chamber was depressurized at the state applying the initial load of 1.5 kN to the material to be processed by the pressuring members. Then, the current-passing was started when the internal pressure of the chamber reached the range from 3 Pa to 4 Pa. Further, the current-passing conditions were set so that a temperature rising rate of a surface temperature of the metallic portion to be formed was set at 150° C./min, and the current-passing was stopped when the surface temperature of the metallic portion reached the range from 450° C. to 460° C.

The heat-resistant member thus diffusion-bonded via the pressurized current-passing was collected by opening the chamber after the heat-resistant member thus formed was cooled to 100° C. or less. A metallographic structure of the heat-resistant member of Example 1-1 thus manufactured was analyzed. As a result, formation of an intermediate layer made of an intermetallic compound $Ni_3Al$ was determined.

Example 1-2

A heat-resistant member of Example 1-2 was manufactured the same as in Example 1-1 except for using particles of pure nickel with a mean particle diameter of 3 μm and a volume fraction of 54 volume % as the metal particles, and shirasu soil with a mean particle diameter of 50 μm and a volume rate of 46 volume % as the hollow inorganic compound particles. A metallographic structure of the heat-resistant member of Example 1-2 thus manufactured was analyzed. As a result, formation of an intermediate layer made of an intermetallic compound $Ni_3Al$ was determined.

Example 1-3

A heat-resistant member of Example 1-3 was manufactured the same as in Example 1-1 except for using particles of pure aluminum with a mean particle diameter of 25 μm and a volume fraction of 40 volume % as the metal particles, and shirasu soil with a mean particle diameter of 50 μm and a volume rate of 60 volume % as the hollow inorganic compound particles. The resulting heat-resistant member of Example 1-3 had a high volume fraction of the hollow inorganic compound particles with an insulating property, resulting in loss of the electric conductivity. As a result, any heat-shielding coating was not formed by the pressurized current-passing.

Example 1-4

A heat-resistant member of Example 1-4 was manufactured the same as in Example 1-1 except for using particles of pure aluminum with a mean particle diameter of 25 μm and a volume fraction of 50 volume % as the metal particles, and shirasu soil with a mean particle diameter of 50 μm and a volume rate of 50 volume % as the hollow inorganic compound particles. A metallographic structure of the heat-resistant member of Example 1-4 thus manufactured was analyzed. As a result, an intermediate layer made of an intermetallic compound was not formed because the metal particle and the base material were made of the same metal. A heat-resistant coating was rather fragile due to the relatively high volume fraction of the hollow inorganic compound particles.

Example 1-5

A heat-resistant member of Example 1-5 was manufactured the same as in Example 1-1 except for using particles of pure aluminum with a mean particle diameter of 25 μm and a volume fraction of 60 volume % as the metal particles, and shirasu soil with a mean particle diameter of 50 μm and a volume rate of 40 volume % as the hollow inorganic compound particles. A metallographic structure of the heat-resistant member of Example 1-5 thus manufactured was analyzed. As a result, an intermediate layer made of an intermetallic compound was not formed because the metal particle and the base material were made of the same metal.

Example 1-6

A heat-resistant member of Example 1-6 was manufactured the same as in Example 1-1 except for using particles of pure aluminum with a mean particle diameter of 25 μm and a volume fraction of 70 volume % as the metal particles, and shirasu soil with a mean particle diameter of 50 μm and a volume fraction of volume % as the hollow inorganic compound particles. A metallographic structure of the heat-resistant member of Example 1-6 thus manufactured was analyzed. As a result, an intermediate layer made of an intermetallic compound was not formed because the metal particle and the base material were made of the same metal.

Example 1-7

A heat-resistant member of Example 1-5 was manufactured the same as in Example 1-1 except for using particles of pure nickel with a mean particle diameter of 3 μm and a volume fraction of 82 volume % as the metal particles, and hollow glass with a mean particle diameter of 24 μm and a volume fraction of 12 volume % as the hollow inorganic compound particles. Herein, as the hollow glass, used were glass bubbles "S6OHS" having a composition of 80 volume % of $SiO_2$, 13 volume % of $B_2O_3$, and the remaining part of NaO and $Al_2O_3$. In the heat-resistant member of Example 1-7 thus manufactured, a heat-shielding coating with good electric conductivity was appropriately formed due to the small particle diameters of the metal particles.

Example 2-1

A heat-resistant member of Example 2-1 was manufactured to have a two-layer structure consisting of inner and outer layers. The inner layer was prepared by using particles of pure nickel with a mean particle diameter of 3 μm and a volume fraction of 82 volume % as the metal particles, and shirasu soil with a mean particle diameter of 50 μm at a volume fraction of 18 volume % as the hollow inorganic compound particles. Further, the outer layer was prepared by using particles of pure nickel with a mean particle diameter of 3 μm and a volume fraction of 54 volume % as the metal particles, and shirasu soil with a mean particle diameter of 50 μm at a volume fraction of 46 volume % as the hollow inorganic compound particles.

A heat-shielding coating was formed by performing the pressurized current-passing all at once the same as in Example 1-1 except that the mixed particles were filled in the stacked state into the recessed portion of the base material.

A metallographic structure of the heat-resistant member of Example 2-1 thus manufactured was analyzed. As a result, formation of an intermediate layer made of an intermetallic compound $Ni_3Al$ was determined between the base material and the inner layer.

Example 2-2

A heat-resistant member of Example 2-2 was manufactured to have a two-layer structure consisting of inner and outer layers. The inner layer was prepared by using particles of pure nickel with a mean particle diameter of 3 μm and a volume fraction of 82 volume % as the metal particles, and shirasu soil with a mean particle diameter of 50 μm and a volume fraction of 18 volume % as the hollow inorganic compound particles. Further, the outer layer was prepared by using particles of pure nickel with a mean particle diameter of 3 μm and a volume fraction of 54 volume % as the metal particles, and shirasu soil with a mean particle diameter of 50 μm at a volume fraction of 46 volume % as the hollow inorganic compound particles.

First, the mixed particles were filled in the recessed portion of the base material, and the inner layer was formed via the pressurized current-passing the same as in Example 1-1. Next, the mixed particles used for forming the outer layer were stacked on the inner layer, and the outer layer was formed via the pressurized current-passing the same as in Example 1-1, whereby a heat-shielding coating was prepared.

A metallographic structure of the heat-resistant member of Example 2-2 thus manufactured was analyzed. As a result, formation of an intermediate layer made of an intermetallic compound $Ni_3Al$ was determined between the base material and the inner layer.

Example 2-3

A heat-resistant member of Example 2-3 was manufactured to have an inner layer, an outer layer and a coating layer located at the outer side of the outer layer. The inner layer was prepared by using particles of pure nickel with a mean particle diameter of 3 μm and a volume fraction of 82 volume % as the metal particles, and shirasu soil with a mean particle diameter of 50 μm and a volume rate of 18 volume % as the hollow inorganic compound particles. Further, the outer layer was prepared by using particles of pure nickel with a mean particle diameter of 3 μm and a volume fraction of 54 volume % as the metal particles, and shirasu soil with a mean particle diameter of 50 μm at a volume fraction of 46 volume % as the hollow inorganic compound particles. The coating layer was prepared by using only particles of pure nickel with a mean particle diameter of 3 μm.

A heat-shielding coating was formed via performing the pressurized current-passing all at once the same as in Example 1-1 except that three types of particles respectively to form the inner, outer and coating layers were filled in the stacked state into the recessed portion of the base material. The addition of the coating layer enabled the heat-resistant coating to be appropriately formed although the electric conductivity of Example 2-3 was different from other Examples.

Next, a thermal responsive property of each heat-resistant member provided with the heat-shielding coating thus manufactured was evaluated.

Figure 6:
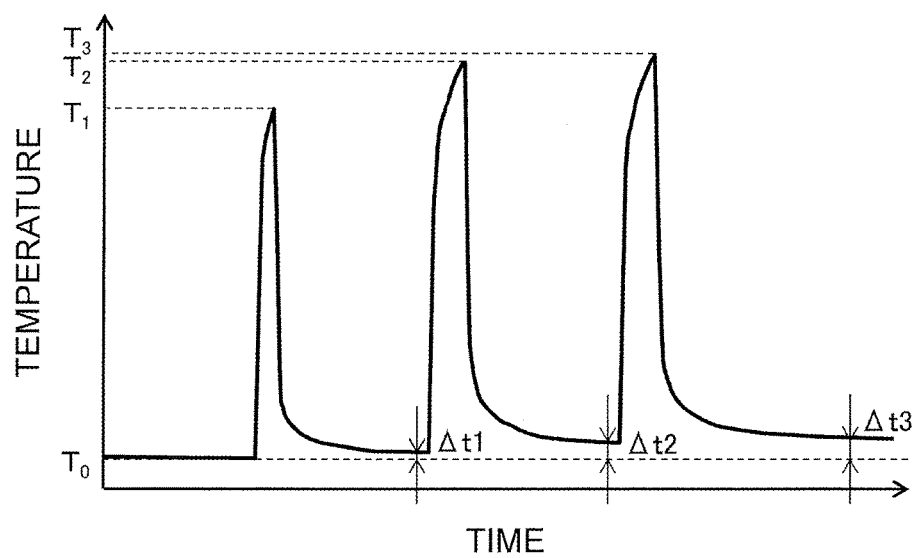
FIG. 6 is a graphic diagram exemplarily showing a thermoresponsive property of a heat-resistant member.

FIG. 6 is a graphic diagram exemplarily showing the thermal responsive property of a heat-resistant member.

As shown in FIG. 6, when combustion gas is heated during a combustion stroke of cycles of an internal combustion engine, a surface temperature of the heat-resistant member follows a temperature of the combustion gas. As a result, the heat-resistant member used as a component configuring a chamber of the internal combustion engine raises a temperature thereof from the standard temperature ($T_0$) at an initial stage of cycles to the attainment temperature ($T_1$). After that, when combustion gas was cooled during an intake stroke, the temperature of the heat-resistant member falls from the attainment temperature ($T_1$) toward the standard temperature ($T_0$).

At that time, the temperature of the heat-resistant member does not completely fall to reach the standard temperature ($T_a$), thereby generating a temperature difference ($\Delta t1$) from the standard temperature ($T_0$) depending on the thermal capacity. When such a temperature difference from the standard temperature ($T_0$) is large, as the cycles of the internal combustion engine proceed, the attainment temperatures ($T_2$, $T_3$, - - - $T_n$) gradually rise, thereby to increase the temperature differences ($\Delta t2$, $\Delta t3$ - - - $\Delta tn$). This phenomenon decreases the intake efficiency of the combustion chamber to cause knocking due to generation of abnormal combustion. Accordingly, it is desired to minimize the temperature differences ($\Delta t2$, $\Delta t3$ - - - $\Delta tn$).

Further, the more the temperature difference between the heat-resistant member and the combustion chamber decreases, the more the thermal loss reduces. Thereby, it is demanded for the temperature of the heat-resistant member sharply to rise up to the attainment temperatures ($T_1$, $T_2$, $T_3$ - - - $T_n$) during combustion strokes while the temperature of the combustion chamber rises. Further, for decreasing the temperature differences ($\Delta t1$, $\Delta t2$, $\Delta t3$ - - - $\Delta tn$), demanded is a thermal responsive property to the heat exchange of the cooling medium in the internal combustion engine.

As mentioned above, it is important for the heat-resistant member to have the excellent thermal responsive property to the temperatures of the combustion chamber, the cooling medium or the like.

In view of the above, the thermal responsive properties of the heat-resistant members of Example 1-1 and Example 1-2 thus manufactured as Examples were evaluated comparing to those of the conventional heat-resistant members (i.e., heat-resistant members of Comparative Examples) based on the temperature changes during the heating and cooling cycles.

Herein, the heat-resistant members in Comparative Examples were prepared by using a base material (Comparative Example 1) of a metal mold casting made of the aluminum alloy "AC8A-T6" (JIS H 5202) having no heat-shielding coating, and another base material (Comparative Example 2) of a metal mold casting made of the aluminum alloy "AC8A-T6" (JIS H 5202) having an anodic oxide coating. The heat-shielding coatings of Example 1-1 and Example 1-2 had thicknesses of about 850 μm, and the anodic oxide coating of Comparative Example 2 had an average thickness of 20 μm.

The thermal responsive properties were measured by repeatedly conducting the heating processes via irradiating a laser-beam onto the surfaces of the heat-resistant members, and the cooling processes of the surfaces of the heat-resistant members, whereby the changes of the surface temperatures were measured. The heating process was conducted by fixing the output of laser-beam through all the Examples. The cooling process was conducted by lowering the surface temperature to 100° C. after completion of the heating process. The heating and cooling cycles were performed three times in total.

Figure 7:
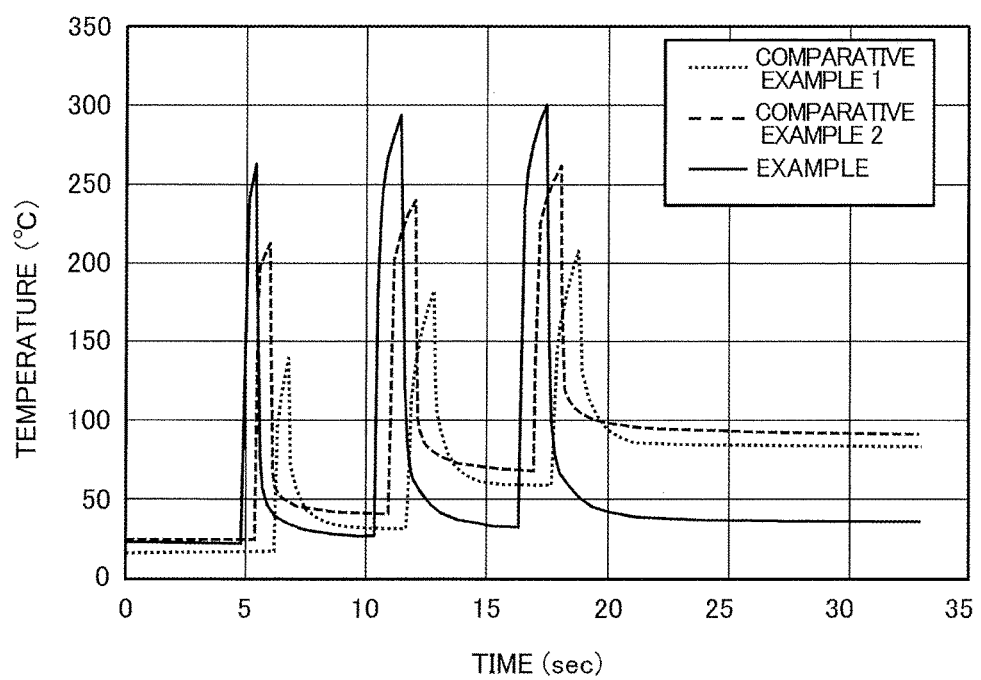
FIG. 7 is a graphic diagram showing measured results of temperature changes of heat-resistant members.

Here, note that Comparative Examples 1 and 2 made of the aluminum alloy had small absorption rates of the laser-beam. Thus, the heating process was conducted after applying a heat-resistant black pigment to each Comparative Example in advance. Table 1 and FIG. 7 show the initial temperatures (i.e., standard temperatures ($T_0$)s measured before starting the respective cycles, the attainment temperatures ($T_1$, $T_2$, $T_3$) measured in the respective heating processes, the temperature differences ($\Delta t1$, $\Delta t2$, $\Delta t3$) from the standard temperatures ($T_0$)s measured in the respective cooling processes.

TABLE 1

| | Initial Temperatures (° C.) | Attainment Temperatures (° C.) | | | Temperature Differences (° C.) | | |
|---|---|---|---|---|---|---|---|
| | $T_0$ | $T_1$ | $T_2$ | $T_3$ | $\Delta t1$ | $\Delta t2$ | $\Delta t3$ |
| Example 1-1 | 22.1 | 263.6 | 293.4 | 300.2 | 3.9 | 9.7 | 13.7 |
| Example 1-2 | 17.7 | 320.3 | 347.8 | 353.2 | 2.7 | 7.9 | 11.9 |
| Comparative Example 1 | 16.1 | 140.7 | 183.3 | 208.3 | 15.2 | 42.4 | 68.4 |
| Comparative Example 2 | 23.8 | 214.0 | 239.8 | 262.3 | 17.4 | 44.7 | 69.4 |

As shown in Table 1, the attainment temperatures ($T_1$, $T_2$, $T_3$) higher than those in Comparative Examples 1 and 2 are realized in Examples 1-1 and 1-2 thus manufactured as Examples. The changes in the temperatures from the attainment temperatures ($T_1$)s to the attainment temperatures ($T_3$)s after the repeated cycles show a tendency to be smaller than those in Comparative Examples 1 and 2. Further, the temperature differences ($\Delta t1$, $\Delta t2$, $\Delta t3$) in Examples 1-1 and 1-2 thus manufactured as Examples are greatly reduced compared to those in Comparative Examples 1 and 2, resulting in the greatly small change between the temperature differences ($\Delta t1$) and ($\Delta t3$) after the repeated cycles.

As described above, the evaluation results of the Examples of the present invention indicate that nevertheless each Example has a relatively large thickness, the heat capacity is reduced thereby realizing a heat-resistant member excellent in the heat responsive property.

FIG. 7 is a graphic diagram showing measured results of the temperature changes of the heat-resistant members.

FIG. 7 is a graphic diagram showing the measured results of the temperature changes of Example 1-1 manufactured as an Example, and Comparative Examples 1 and 2. As shown in FIG. 7, it is confirmed that the Example shows an attainment temperature higher than those of Comparative Examples 1 and 2, and the temperature in the Example dropped in the cooling process shows a tendency close to the initial temperature.

Further, the Example also shows a tendency that the start timings of the temperature rise and drop occur earlier than those of Comparative Examples 1 and 2, and the cooling rate is higher than those of Comparative Examples 1 and 2. Those results indicate that the Example has an excellent thermal responsive property. Thus, it is determined that the reduction of the thermal capacity is effectively realized in the Example of the present invention.

Next, as Examples of the present invention, Examples 3-1 to 3-3 were manufactured, in which each heat-resistant member provided with a heat-shielding coating was applied to a piston of an internal combustion engine. Note, in each Example, a dummy piston simulating a piston product of an internal combustion engine was manufactured.

Figure 8A:
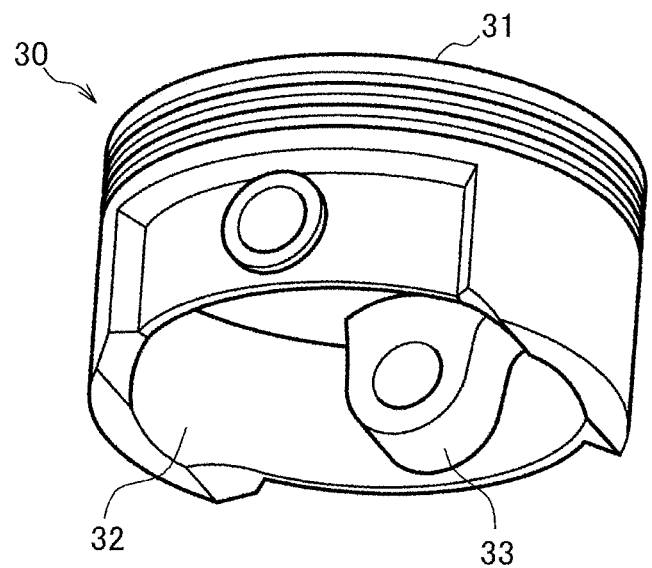
FIGS. 8A and 8B are perspective views respectively showing a piston of an internal combustion engine and a pressurizing member.
Figure 8B:
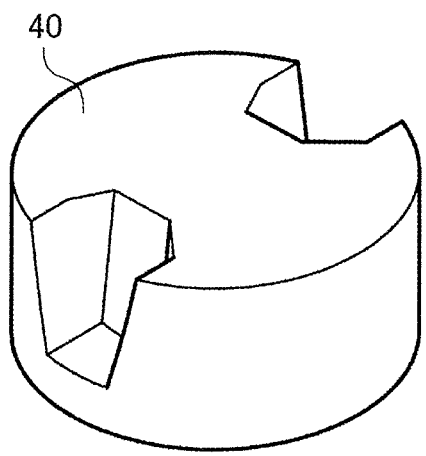
Figure 9:
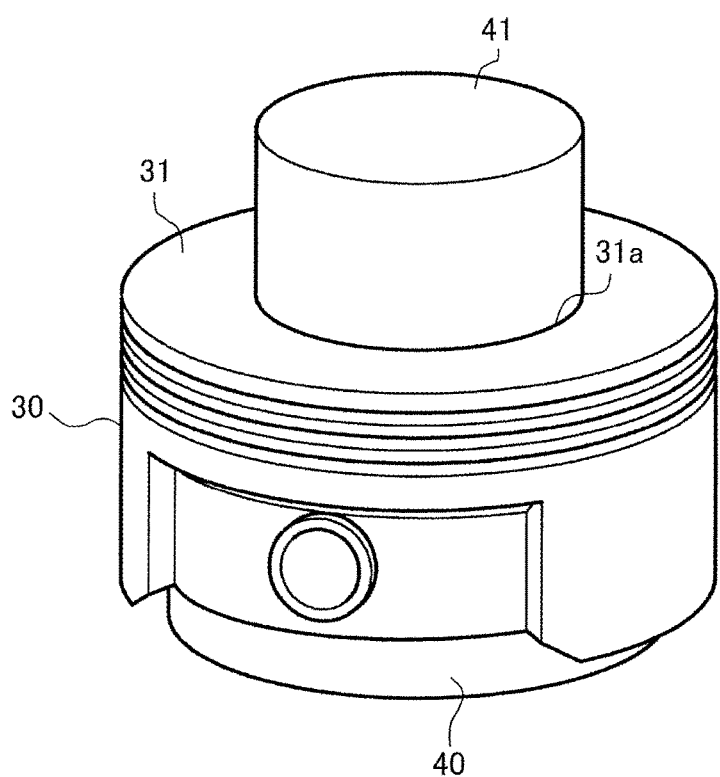
FIG. 9 is a perspective view showing a piston of an internal combustion engine held by a pressurizing member.
Figure 10A:
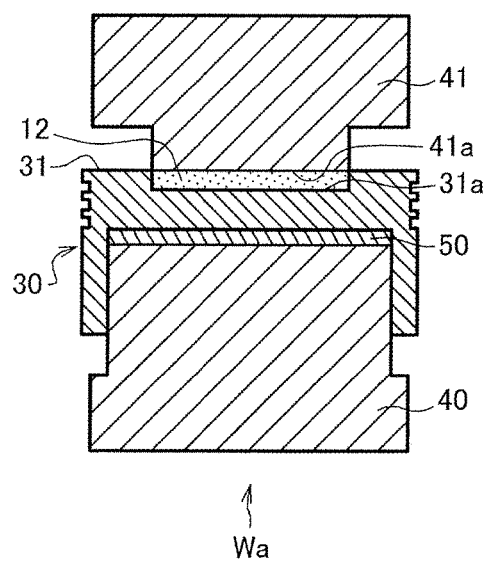
FIGS. 10A and 10B are cross-sectional views each showing a piston of an internal combustion engine held by a pressurizing member.
Figure 10B:
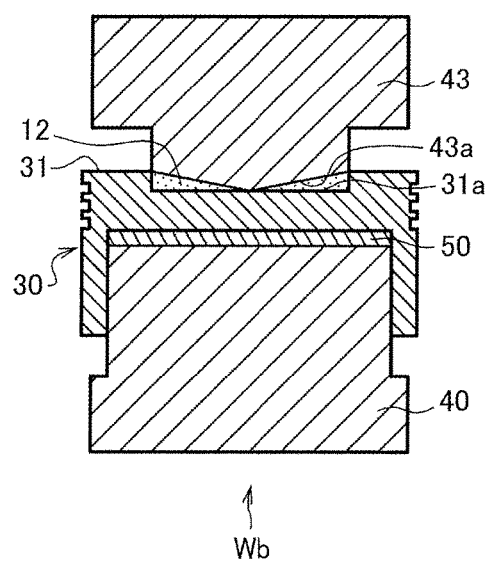

FIGS. 8A and 8B are perspective views respectively showing a piston of an internal combustion engine and a pressurizing member; FIG. 8A is a perspective view of the piston of the internal combustion engine when viewed from the lower side thereof; and FIG. 8B is a perspective view of the pressurizing member. Further, FIG. 9 is a perspective view showing a piston of an internal combustion engine held by a pressurizing member. Moreover, FIGS. 10A and 10B are cross-sectional views each showing a piston of an internal combustion engine held by a pressurizing member.

As shown in FIG. 8A, the piston (i.e., dummy piston) of the internal combustion engine 30 of this Example was configured so that the heat-shielding coating was formed on a piston head 31, having a simple structure easily subjected to the pressurized current-passing. More specifically, a skirt part 32 had an inner surface formed of a smooth curved surface, and the piston head 31 on which a heat-resistant coating was formed had a level surface such that a pressurizing member 40 was easily engaged with the piston 30.

Note, a recessed portion 31a (see FIG. 9) was formed on the level surface, and mixed particles of metal particles and inorganic compound particles were filled in the recessed portion 31a. Here, a material of the dummy piston 30 had a chemical composition similarly to the metal mold casting made of the aluminum alloy "AC8A" (JIS H 5202).

Further, as shown in FIG. 8B, the top surface of the pressurizing member 40 was formed as a level surface such that the pressurizing member 40 easily contacted the upper surface inside the skirt part 32 of the dummy piston 30, and the bottom surface of the pressurizing member 40 was also formed as a level surface. Moreover, the top side of the pressurizing member 40 was partially cut-off to be fitted to boss parts 33 of the dummy piston 30. The pressurizing member 40 and the complementary pressurizing units 41 and 43 (see FIGS. 9, 10A and 10B) were made of a carbon substance.

The heat-resistant members of Examples 3-1 to 3-3 were manufactured by modifying shapes of the pressurizing units 41 and 43 to be arranged at the surface side of the cylinder head and also a material of the metal particles, and performing the pressurized current-passing, as described below. Here, one pressurizing unit 41 was formed so that a lower end surface 43a used for pressurizing the mixed particles 12 had a level surface (see FIG. 10A). The other pressurizing unit 43 was formed so that the lower end surface 43a used for pressurizing the mixed particles 12 had a protruded conical shape, thereby to form the top surface of the heat-shielding coating in a conically recessed shape (see FIG. 10B).

As shown in FIGS. 9, 10A and 10B, the pressurized current-passing was performed by using the dummy piston 30 filled with the mixed particles 12 in the recessed portion 31a, the pressurizing member 40 provided with the carbon sheet 50 on the top surface of the pressurizing member 40, and the materials Wa and Wb respectively held by the pressurizing units 41 and 43.

The material Wa and Wb were separately placed in the current-bonding device 100 having a structure shown in FIG. 4B, and then the material Wa and Wb were separately subjected to the pressurized current-passing under the appropriated conditions. Note, the carbon sheet 50 was used in order to increase the contact area between the dummy piston 30 and the pressurizing member 40, thereby securing the electric conductivity thereof.

Example 3-1

A dummy piston of Example 3-1 was manufactured by using the pressurizing unit 41 shown in FIG. 10A, and a heat-shielding coating having the same composition as in Example 1-2. That is, the heat-shielding coating was prepared by using particles made of pure nickel with a mean particle diameter of 3 μm and a volume fraction of 54 volume % as the metal particles, and shirasu soil with a mean particle diameter of 50 μm and a volume fraction of volume % as the inorganic compound particles. The dummy piston of Example 3-1 was subjected to the pressurized current-passing via preferably passing a current. It was determined that the heat-shielding coating having an intermediate layer was formed via diffusion-bonding.

Example 3-2

A dummy piston of Example 3-2 was manufactured by using the pressurizing unit 41 shown in FIG. 10A, and a heat-shielding coating having the same composition as in Example 1-5. That is, the heat-shielding coating was prepared by using particles made of pure aluminum with a mean particle diameter of 25 μm and a volume fraction of 60 volume % as the metal particles, and shirasu soil with a mean particle diameter of 50 μm and a volume fraction of 40 volume % as the inorganic compound particles. The dummy piston of Example 3-2 was subjected to the pressurized current-passing via preferably passing a current. It was determined that the heat-shielding coating having an intermediate layer was formed via diffusion-bonding.

Example 3-3

A dummy piston of Example 3-3 was manufactured the same as in Example 3-1 except for using the pressurizing unit 43 shown in FIG. 10B. The dummy piston of Example 3-3 was subjected to the pressurized current-passing via preferably passing a current. It was determined that the appropriate shape of the pressurizing unit enabled near-net shaping of the heat-shielding coating.

Example 3-4

A dummy piston of Example 3-4 was manufactured the same as in Example 3-2 except for using the pressurizing unit 43 shown in FIG. 10B. The dummy piston of Example 3-3 was subjected to the pressurized current-passing via preferably passing a current. It was determined that the appropriate shape of the pressurizing unit enabled near-net shaping of the heat-shielding coating.

DESCRIPTIONS OF REFERENCES

1 Base Material
2 Metal Particle
4 Hollow Inorganic Compound Particle
5 Solid Inorganic Compound Particle
6 Pore
10 Heat-Resistant Member
11 Heat-Shielding Coating

The invention claimed is:

1. A heat-resistant member provided with a heat-shielding coating, the heat-shielding coating comprising:
   a metallic portion formed of agglomerates of a plurality of metal particles; and
   inorganic compound particles dispersed in the metallic portion, wherein the metal particles are bonded each other via diffusion-bonding, and the metallic portion and a base material of the heat-resistant member are bonded each other via diffusion bonding, and
   a recessed portion is formed on a surface of the base material;
   the base material is the piston, and the heat-shielding coating is formed on a piston head;
   the base material is the piston made of aluminum or an aluminum alloy, the plurality of metal particles included in the heat-shielding coating are made of one selected from aluminum, an aluminum alloy, nickel and a nickel alloy.

2. The heat-resistant member according to claim 1, wherein the plurality of metal particles are bonded each other leaving pores in the metallic portion.

3. The heat-resistant member according to claim 1, wherein the inorganic compound particles are comprised of hollow inorganic compound particles each having a hollow structure, or a combination of hollow inorganic compound particles and solid inorganic compound particles each having a solid structure.

4. The heat-resistant member according to claim 1, wherein
   the heat-shielding coating further comprises an intermediate layer formed of an intermetallic compound between the metallic portion and the base material, and
   the metallic portion and the base material are bonded across the intermediate layer.

5. The heat-resistant member according to claim 1, wherein the metal particles have a mean particle diameter which is at most one-third time as large as a mean particle diameter of the inorganic compound particles.

6. The heat-resistant member according to claim 1, wherein the metal particles have a mean particle diameter which is at most one-tenth time as large as a mean particle diameter of the inorganic compound particles.

7. The heat-resistant member according to claim 1, wherein the inorganic compound particles have a volume fraction ranging from 10% to 65% in the metallic portion.

8. The heat-resistant member according to claim 1, wherein the inorganic compound particles have a volume fraction gradiently changed in a thickness direction of the heat-shielding coating.

9. The heat-resistant member according to claim 1, wherein the heat-shielding coating further comprises a coating layer placed on a surface of the metallic portion opposite to the base material.

10. The heat-resistant member according to claim 1, wherein the heat-shielding coating has a thickness ranging from 0.1 mm to 5 mm.

* * * * *